United States Patent
Takahashi

(10) Patent No.: US 10,379,001 B2
(45) Date of Patent: Aug. 13, 2019

(54) DETECTING APPARATUS, DETECTION METHOD, AND PROGRAM

(71) Applicant: International Business Machines Corporation, Armonk, NY (US)

(72) Inventor: Toshihiro Takahashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/857,053

(22) Filed: Sep. 17, 2015

(65) Prior Publication Data

US 2016/0076970 A1    Mar. 17, 2016

(30) Foreign Application Priority Data

Sep. 17, 2014   (JP) .................. 2014-189210

(51) Int. Cl.

| | |
|---|---|
| *G06N 5/00* | (2006.01) |
| *G01M 13/045* | (2019.01) |
| *G01H 1/00* | (2006.01) |
| *G06N 20/00* | (2019.01) |
| *G06N 7/00* | (2006.01) |

(Continued)

(52) U.S. Cl.
CPC .......... *G01M 13/045* (2013.01); *G01H 1/003* (2013.01); *G06N 20/00* (2019.01); *G01M 13/02* (2013.01); *G06N 5/00* (2013.01); *G06N 5/04* (2013.01); *G06N 7/005* (2013.01)

(58) Field of Classification Search
CPC .. G01M 13/045; G01H 1/003; G06N 99/0005
USPC .......................................................... 702/33
See application file for complete search history.

(56) References Cited

U.S. PATENT DOCUMENTS

| | | | | |
|---|---|---|---|---|
| 5,630,019 A | * | 5/1997 | Kochi .................. | G06N 3/0454 706/20 |
| 8,239,170 B2 | * | 8/2012 | Wegerich ........... | G06K 9/00536 702/189 |

(Continued)

FOREIGN PATENT DOCUMENTS

| | | |
|---|---|---|
| JP | 59075125 A | 4/1984 |
| JP | 2005285005 A | 10/2005 |

(Continued)

*Primary Examiner* — John E Breene
*Assistant Examiner* — Christine Y Liao
(74) *Attorney, Agent, or Firm* — Robert J. Shatto

(57) ABSTRACT

Provided is a detecting apparatus for detecting one or more anomalies of an operating body. The detecting apparatus includes a processor communicatively coupled to a dividing unit, a model learning unit, a difference calculating unit, and an anomaly detecting unit. The dividing unit divides a data sequence corresponding to an operation of the operating body into a plurality of divided data sequences in a time direction. The model learning unit learns each of the plurality of divided data sequences according to a regression model in the time direction, and calculates a model component modeling each of the divided data sequences. The difference calculating unit calculates a difference component indicating a difference between each of the plurality of divided data sequences and their corresponding model component. The anomaly detecting unit detects one or more anomalies of the operating body based on the calculated difference components.

8 Claims, 10 Drawing Sheets

(51) Int. Cl.
    *G06N 5/04*          (2006.01)
    *G01M 13/02*      (2019.01)

(56) References Cited

U.S. PATENT DOCUMENTS

| | | | |
|---|---|---|---|
| 8,306,931 B1 * | 11/2012 | Bowman | G06N 3/0454 706/20 |
| 2008/0033695 A1 * | 2/2008 | Sahara | G01H 1/003 702/185 |
| 2012/0166142 A1 | 6/2012 | Maeda et al. | |

FOREIGN PATENT DOCUMENTS

| | | | |
|---|---|---|---|
| JP | 2011059790 | 3/2011 | |
| JP | 2013030015 | 2/2013 | |
| JP | WO 2015033869 A1 * | 3/2015 | ......... G05B 23/0221 |
| JP | 5943357 B2 | 7/2016 | |

\* cited by examiner

| DATA | i1 | i2 | i3 | i4 |
|---|---|---|---|---|
| SAMPLE 1 | 3 | 100 | 0.9 | 1000 |
| SAMPLE 2 | 9 | 10 | 10.1 | 2000 |
| SAMPLE 3 | 33 | 50 | 1.2 | 3000 |

FIG. 8

| DATA | i1 | i2 | i3 | i4 |
|---|---|---|---|---|
| SAMPLE 1 | RANK 1 | RANK 3 | RANK 1 | RANK 1 |
| SAMPLE 2 | RANK 2 | RANK 1 | RANK 3 | RANK 2 |
| SAMPLE 3 | RANK 3 | RANK 2 | RANK 2 | RANK 3 |

FIG. 9

| DATA | i1 | i2 | i3 | i4 |
|---|---|---|---|---|
| SAMPLE 1 | 0 | 1 | 0 | 0 |
| SAMPLE 2 | 0.5 | 0 | 1 | 0.5 |
| SAMPLE 3 | 1 | 0.5 | 0.5 | 1 |

FIG. 10

DETECTING APPARATUS, DETECTION METHOD, AND PROGRAM

BACKGROUND

The present invention relates to a detecting apparatus, a detection method, and a program.

Traditionally known detection of an anomaly in an operating body or the like that periodically operates has been performed by detecting vibration or the like in response to an operation of the operating body, transforming detected time-series data into frequency data, and analyzing a frequency spectrum. See, for example, Patent Literatures JP2013-30015A and JP2011-59790A.

However, a spectrum signal indicating a normal operation of the operating body or the like may change over time in signal strength and a generated frequency due to, for example, an implementation state of the operating body, a surrounding environment such as temperature, and a physical change caused by abrasion or the like. Moreover, since the spectrum signal also has an individual difference, it has been difficult to detect the anomaly through a spectral analysis of a predetermined frequency or the like. Even further, unlike an ideal bright-line spectrum it has been difficult to accurately detect the anomaly based on increase or decrease in the noise component since the spectrum signal indicating the normal operation has a noise component to be superimposed with a noise component indicating an abnormal operation of the operating body.

BRIEF SUMMARY

In one embodiment, a detecting apparatus for detecting one or more anomalies of an operating body that periodically operates is disclosed. The detecting apparatus comprises a processor that is communicatively coupled to a dividing unit, a model learning unit, a difference calculating unit, and an anomaly detecting unit. The dividing unit divides a data sequence acquired through detection of an operation of the operating body into a plurality of divided data sequences in a time direction. The model learning unit learns each of the plurality of divided data sequences according to a regression model in the time direction, and calculating a model component that models each of the divided data sequences. The difference calculating calculates a difference component indicating a difference between each of the plurality of divided data sequences and the model component corresponding thereto. The anomaly detecting unit detects one or more anomalies of the operating body based on the difference component for each of the plurality of divided data sequences.

In another embodiment, a method for detecting one or more anomalies of an operating body that periodically operates is disclosed. The method comprises dividing a data sequence acquired through detection of an operation of the operating body into a plurality of divided data sequences in a time direction. Each of the plurality of divided data sequences is learned according to a regression model in the time direction. A model component that models each of the divided data sequences is calculated. A difference component indicating a difference between each of the plurality of divided data sequences and the model component corresponding thereto is calculated. One or more anomalies of the operating body are detected based on the difference component for each of the plurality of divided data sequences.

In yet another embodiment, a program product for causing a computer to detect one or more anomalies of an operating body that periodically operates is disclosed. The program product, when executed, causes the computer to perform a method. The method comprises dividing a data sequence acquired through detection of an operation of the operating body into a plurality of divided data sequences in a time direction. Each of the plurality of divided data sequences is learned according to a regression model in the time direction. A model component that models each of the divided data sequences is calculated. A difference component indicating a difference between each of the plurality of divided data sequences and the model component corresponding thereto is calculated. One or more anomalies of the operating body are detected based on the difference component for each of the plurality of divided data sequences.

It should be noted that the above described summary of the invention does not list all necessary features of the present invention. Moreover, a subcombination of groups of these features may also make the invention.

BRIEF DESCRIPTION OF THE SEVERAL VIEWS OF THE DRAWINGS

FIG. 8 illustrates an example of feature quantities calculated by a feature quantity calculating unit of this embodiment;

FIG. 9 illustrates an example of ranks of the feature quantities of divided data sequences, which have been defined by the feature quantity calculating unit of this embodiment;

FIG. 10 illustrates an example of the feature quantities of the divided data sequences, which have been linearly transformed by the feature quantity calculating unit of this embodiment;

DETAILED DESCRIPTION

While the present invention will be described below through one or more embodiments, the following embodiment is not intended to limit the disclosure according to the claims. Moreover, all combinations of features described in the embodiment are not necessarily essential for solutions in the invention.

Figure 1:
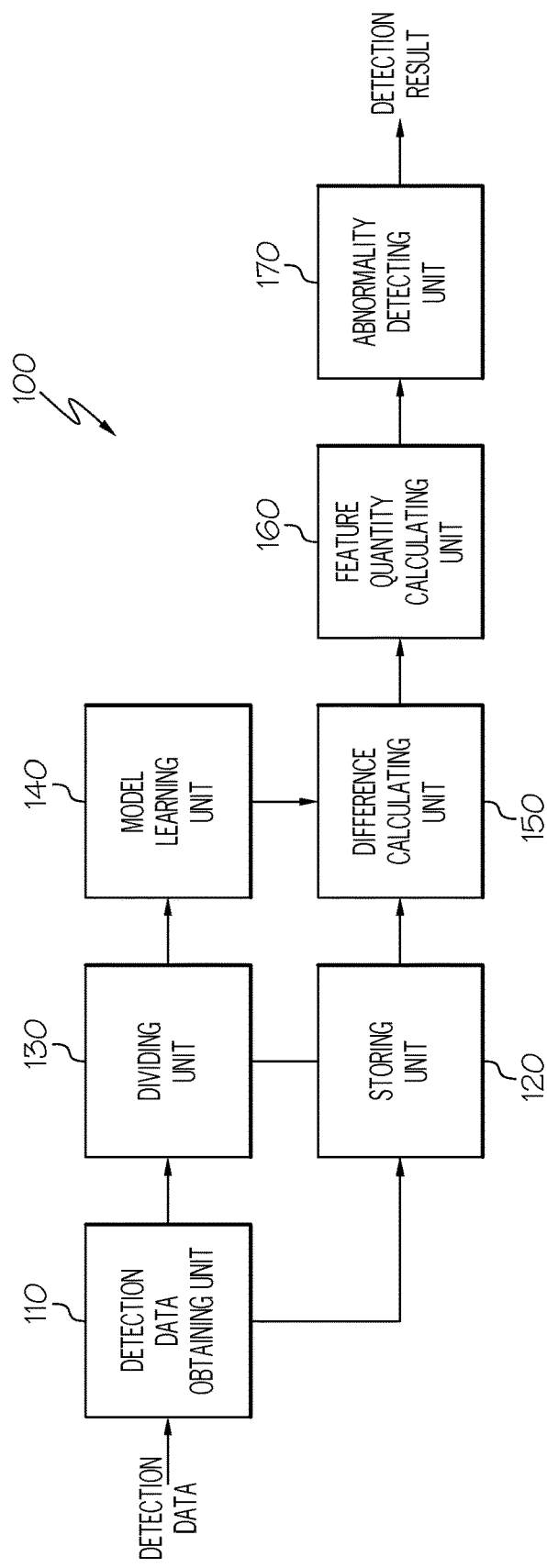
FIG. 1 illustrates a configuration example of a detecting apparatus according to this embodiment.

FIG. 1 illustrates a configuration example of a detecting apparatus 100 according to this embodiment. The detecting apparatus 100, through learning, predicts time-series data to be obtained in the case of an normal operation of an operating body or the like that periodically operates, based on a time-series detection signal detected in response to an operation of the operating body, and detects anomaly of the operating body, depending on a difference component between a predicted model component and the detection signal.

Here, the operating body repeats a periodic operation, such as vibration, for a certain period of time. Moreover, the operating body may include a rotating body that performs a rotational motion about an axis, which is a point or a straight line. The operating body may be, for example, a bearing or the like incorporated in equipment for wind power generation, a chemical generation plant, a robotic arm, a reducer and the like. The detecting apparatus 100 detects an abnormal operation, such as deterioration and damage, of such an operating body. The detecting apparatus 100 includes a detection data obtaining unit 110, a storing unit 120, a dividing unit 130, a model learning unit 140, a difference calculating unit 150, a feature quantity calculating unit 160, and an anomaly detecting unit 170.

The detection data obtaining unit 110 is disposed around or near the operating body, and obtains detection data in the detecting apparatus that detects the operation of the operating body. The detection data obtaining unit 110 obtains the detection data that is a temporally continuous data sequence. Here, the detecting apparatus is a sensor that detects the periodic operation of the operating body, such as an acceleration sensor, a rotation number sensor, and a magnetic sensor, for example. The detecting apparatus may be a multiaxial detection sensor that detects acceleration or the like in multiple axis directions.

The detection data obtaining unit 110 is connected to such a sensor, and obtains the detection data, such as acceleration, a vibration period, and a rotation number of the operating body. The detection data obtaining unit 110 may alternatively read and obtain the detection data stored in a predetermined format. The detection data obtaining unit 110 may also be connected to a network or the like and obtain the detection data through the network. The detection data obtaining unit 110 supplies the obtained detection data to the storing unit 120 and the dividing unit 130.

The storing unit 120 is connected to the detection data obtaining unit 110, and stores the detection data received from the detection data obtaining unit 110. The storing unit 120 may also store each of intermediate data, a calculation result and the like, in the process of the anomaly detection in the detecting apparatus 100. Moreover, the storing unit 120 may supply the stored data to a requestor in response to a request from each unit within the detecting apparatus 100. The storing unit 120 is, for example, connected to the detection data obtaining unit 110, and stores the detection data if the detection data is received from the detection data obtaining unit 110. The storing unit 120 then supplies the stored detection data to the dividing unit 130 in response to the request from the dividing unit 130.

The dividing unit 130 is connected to the detection data obtaining unit 110 and/or the storing unit 120, and divides a data sequence acquired through the detection of the operation of the operating body, into a plurality of divided data sequences in a time direction. The dividing unit 130 may divide a data sequence arranged in a time-series manner, at predetermined time intervals, to generate divided data.

Moreover, the dividing unit 130 divides the data sequence into the plurality of divided data sequences, in accordance with an operation period of the operating body. The dividing unit 130, for example, temporally divides the data sequence into the plurality of divided data sequences, and then arranges the plurality of divided data sequences in order in accordance with the operation period of the operating body. Moreover, if the operating body is the rotating body, the dividing unit 130 may also divide a data sequence based on the acceleration detected in response to rotation of the rotating body, into a plurality of divided data sequences. The dividing unit 130 may store the plurality of divided data sequences in the storing unit 120. The dividing unit 130 supplies the plurality of divided data sequences to the model learning unit 140.

The model learning unit 140 is connected to the dividing unit 130, learns each of the plurality of divided data sequences according to a regression model in the time direction, and calculates a model component that models each of the divided data sequences. The model learning unit 140 calculates a model component equivalent to time-series data to be obtained in a normal operation state of the operating body that periodically operates, based on the plurality of divided data sequences. The model learning unit 140 supplies the calculated model component to the difference calculating unit 150.

The difference calculating unit 150 is connected to the model learning unit 140, and calculates a difference component indicating a difference between each of the plurality of divided data sequences and the model component corresponding thereto. The difference calculating unit 150 is connected to the storing unit 120, and may read the plurality of divided data sequences stored by the dividing unit 130, or may alternatively receive the plurality of divided data sequences from the dividing unit 130 via the model learning unit 140. The difference calculating unit 150, for example, subtracts a component in response to the periodic operation of the operating body (periodic component), from the corresponding divided data sequence, and calculates a (non-periodic) component different from the periodic operation of the operating body. The difference calculating unit 150 supplies a plurality of the difference components corresponding to the plurality of divided data sequences, to the feature quantity calculating unit 160.

The feature quantity calculating unit 160 is connected to the difference calculating unit 150, and calculates a divided data feature quantity including a feature quantity of the difference component, for each of the plurality of divided data sequences. The feature quantity calculating unit 160, for example, calculates the divided data feature quantity including at least one of dispersion, deviation and average of the difference component, for each of the plurality of divided data sequences. The feature quantity calculating unit 160 may also calculate the divided data feature quantity including an average operation period of the operating body. The feature quantity calculating unit 160 supplies the calculated feature quantity to the anomaly detecting unit 170.

The anomaly detecting unit 170 detects the anomaly of the operating body, based on the difference component for each of the plurality of divided data sequences. The anomaly detecting unit 170 detects the anomaly of the operating body, based on the plurality of difference components for the plurality of divided data sequences divided based on the operation period. In other words, for the plurality of divided data sequences, the anomaly detecting unit 170 detects whether the operating body has performed the abnormal operation, based on an operation frequency of the corresponding operating body, and the difference components. Moreover, if the operating body is the rotating body, the anomaly detecting unit 170 detects the anomaly of the rotating body, based on a plurality of difference components for a plurality of divided data sequences divided based on a rotation period of the rotating body.

The anomaly detecting unit 170 is connected to the feature quantity calculating unit 160, and detects the anomaly of the operating body, based on the divided data feature quantity for each of the plurality of divided data sequences. The anomaly detecting unit 170, for example, calculates a degree of anomaly of each of the plurality of divided data sequences in accordance with a period of the operating body, and detects the anomaly of the operating body, based on a plurality of the degrees of anomaly for the plurality of divided data sequences. Here, the anomaly detecting unit 170 may detect the anomaly of the operating body, based on an average value of the plurality of degrees of anomaly.

Figure 2:
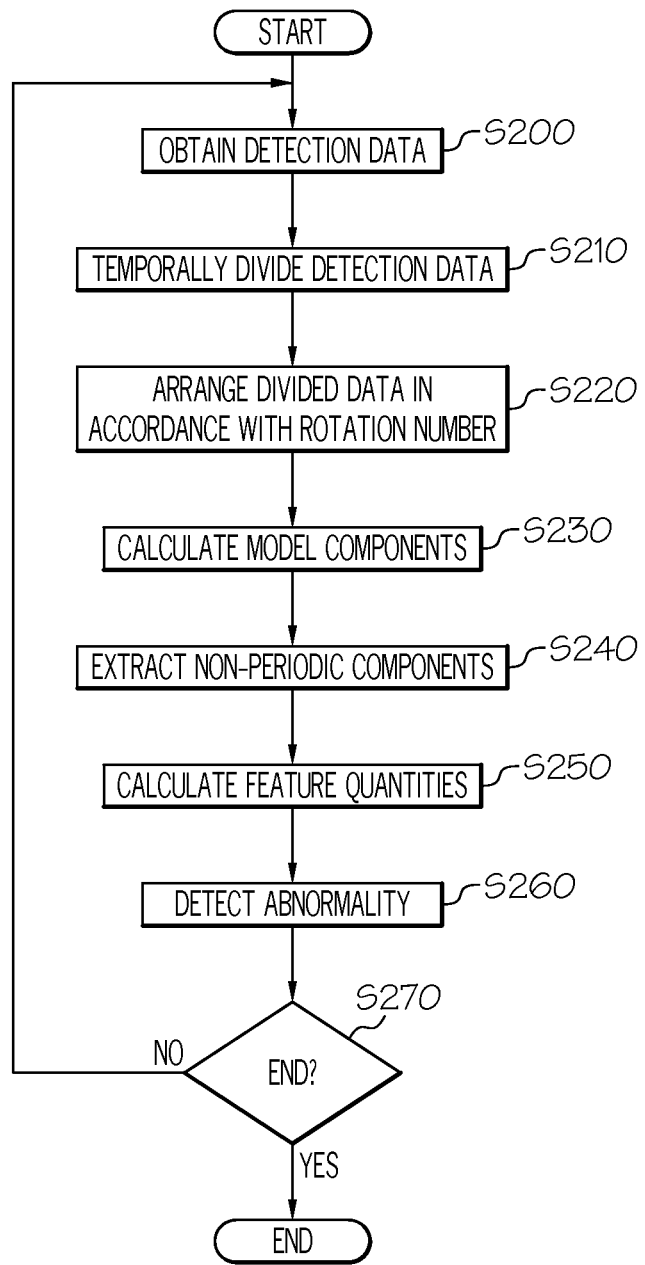
FIG. 2 illustrates an operational flow of the detecting apparatus according to this embodiment.

The above described detecting apparatus 100 of this embodiment detects the anomaly of the operating body that periodically operates, based on the detection data acquired through the detection of the operation of the operating body by the sensor or the like. A detection operation in the detecting apparatus 100 will be described using FIG. 2. FIG. 2 illustrates an operational flow of the detecting apparatus 100 according to this embodiment. The detecting apparatus 100 executes the operational flow illustrated in FIG. 2 to detect the anomaly of the operating body. In this embodiment, an example will be described in which the detecting apparatus 100 detects an abnormal operation of a bearing mounted in equipment for a wind power generating apparatus or the like. Moreover, an example will be described in which the detecting apparatus obtains detection data from three three-dimensional acceleration sensors and one rotation number sensor, and detects an operation of the bearing.

The detection data obtaining unit 110 first obtains the detection data (S200). The detection data obtaining unit 110 may obtain the detection data detected by the detecting apparatus at each predetermined time. In this embodiment, an example will be described in which the detection data obtaining unit 110 obtains time-series data acquired through the detection of the operating body for ten minutes by the detecting apparatus.

The detection data obtaining unit 110, as an example, obtains outputs from the three three-dimensional acceleration sensors and one rotation angle sensor. In other words, the detection data obtaining unit 110 obtains three sets of three outputs corresponding to X-, Y-, and Z-axes of each of the acceleration sensors, as well as an output from one rotation angle sensor, that is, a total of ten pieces of the time-series data, as the detection data. Here, the detection data from the three three-dimensional acceleration sensors is denoted as CH1 to CH9, and the output from the rotation angle sensor is denoted as CH10.

The dividing unit 130 next temporally divides the obtained detection data (S210). The dividing unit 130, as an example, divides the time-series data for ten minutes, at intervals of one minute, to generate ten sets of divided data sequences. In other words, each set includes the divided data sequences acquired through the division of the detection data CH1 to CH10 at each minute, respectively.

The dividing unit 130 next sorts the ten sets of the divided data sequences by a rotation number of the bearing so that the sets are arranged in descending (or ascending) order of the rotation number (S220). The dividing unit 130 may calculate each average value of the output (CH10) from the rotation angle sensor, which is included in each set, and set the average value as the rotation number of each set. In this way, the dividing unit 130 divides the detection data into the ten sets of the divided data sequences arranged in accordance with the rotation number.

The model learning unit 140 next calculates time-series data corresponding to a periodic component of the bearing that is normally operating, as model components through learning with the divided data sequences (S230). Here, if the operating body that periodically operates, such as the bearing, performs the normal operation, the acceleration sensor or the like detects a data sequence having a frequency component in accordance with the period or the like.

Figure 3:
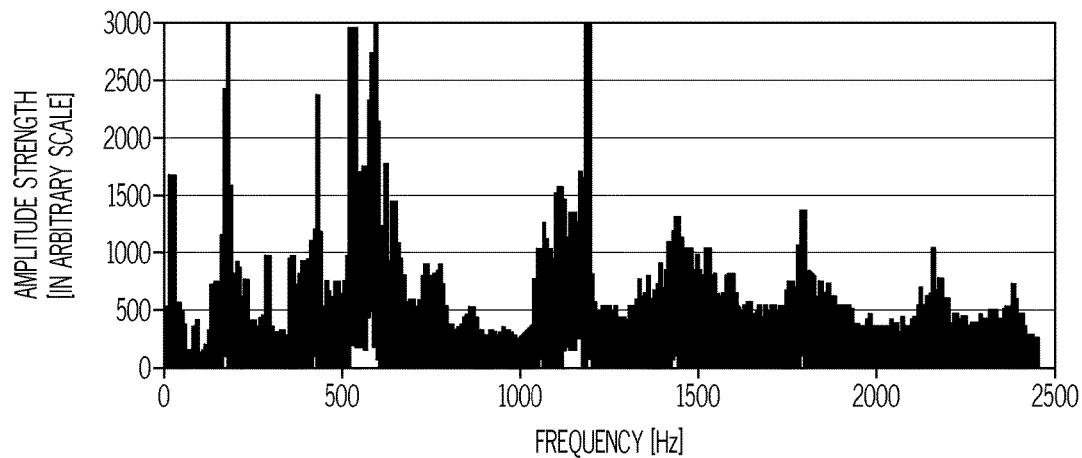
FIG. 3 illustrates an example of frequency characteristics of a data sequence detected during a normal operation of an operating body of this embodiment.

FIG. 3 illustrates an example of frequency characteristics of the data sequence detected during the normal operation of the operating body of this embodiment. FIG. 3 illustrates an example of a result of transformation of the data sequence into the frequency component by a measuring apparatus such as a spectrum analyzer, where the horizontal axis indicates the frequency, and the vertical axis indicates amplitude strength. Moreover, the frequency component is an example of a result of transformation of a data sequence obtained for six seconds by the detecting apparatus, into the frequency component. The frequency component of the data sequence has peaks at specific frequencies, providing a clear difference between the peaks and the frequency component excluding the peaks (noise component). If such frequency characteristics are obtained, the bearing is operating without damage.

Figure 4:
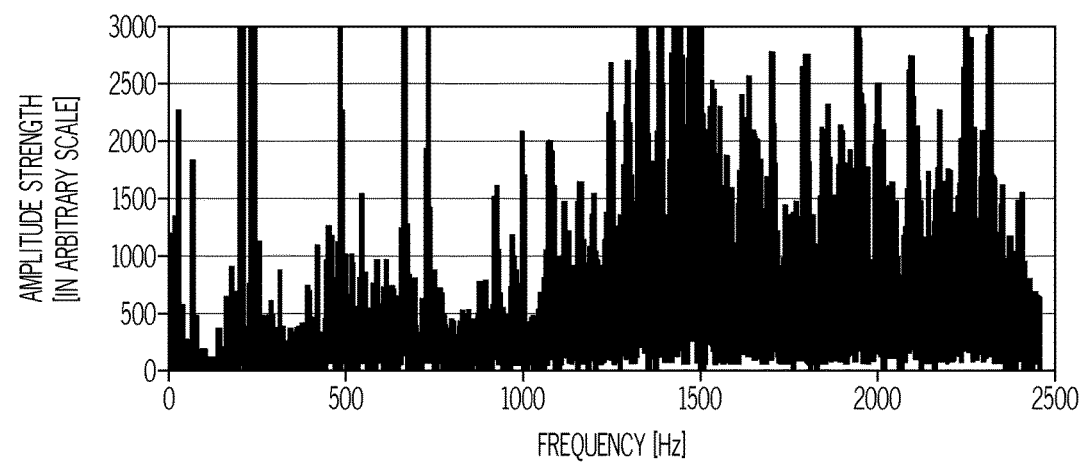
FIG. 4 illustrates an example of frequency characteristics of a data sequence detected in the case of occurrence of initial damage to the operating body of this embodiment.

FIG. 4 illustrates an example of frequency characteristics of a data sequence detected in the case of occurrence of initial damage to the operating body of this embodiment. As in the case of FIG. 3, FIG. 4 illustrates an example of the result of the transformation of the data sequence obtained for six seconds by the detecting apparatus, into the frequency component, where the horizontal axis indicates the frequency, and the vertical axis indicates the amplitude strength. While the frequency component of the data sequence has the peaks at specific frequencies, the number of peaks has increased, and the noise component other than the peaks has increased. If the frequency characteristics illustrated in FIG. 3 are changed to the characteristics illustrated in FIG. 4, the change indicates the occurrence of the initial damage to the bearing, such as a very small flaw, a very small crack, a very small break, and very small chipping.

Figure 5:
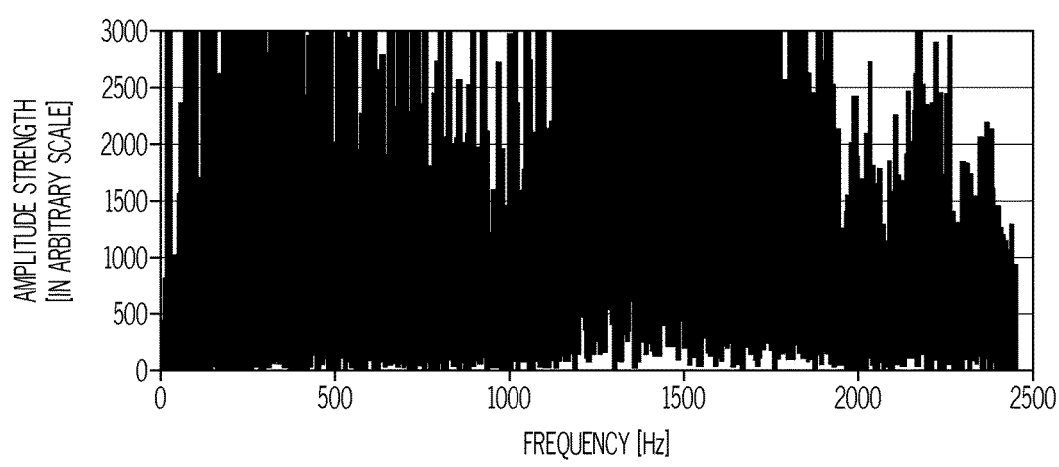
FIG. 5 illustrates an example of frequency characteristics of a data sequence detected in the case of occurrence of damage to the operating body of this embodiment.

FIG. 5 illustrates an example of frequency characteristics of a data sequence detected in the case of occurrence of damage to the operating body of this embodiment. As in the case of FIG. 3, FIG. 5 illustrates an example of the result of the transformation of the data sequence obtained for six seconds by the detecting apparatus, into the frequency component, where the horizontal axis indicates the frequency, and the vertical axis indicates the amplitude strength. In the frequency component of the data sequence, the difference between the peaks at specific frequencies and the noise component other than the peaks has become unclear, so that the peaks have disappeared. If the frequency characteristics illustrated in FIG. 4 are changed to the characteristics illustrated in FIG. 5, the change indicates that the initial damage to the bearing has worsen to develop damage, such as a flaw, a crack, a break, and chipping.

In this way, it can be seen that, in the operating body that periodically operates, such as the bearing, the damage occurs with a sudden non-periodic operation, and non-periodic motions increase as the damage worsens. Accordingly, the detection of the damage to the bearing, based on the increase in the noise component, the increase in the peaks, increase in peak strength, and the like in such a frequency domain, has been known as seen in Patent Literatures JP2013-30015A and JP2011-59790A.

As illustrated in FIGS. 3 to 5, however, the noise component occurs even during the normal operation of the bearing, and moreover, there are individual differences in the number of peaks and frequency locations. It has thus been difficult to make an accurate determination unless an operator or the like checks the frequency characteristics to make the determination. It may become particularly difficult to discriminate a difference between the normal operation state and an initial damage state, and the accurate determination may have been difficult even for a skilled operator. Accordingly, it has been impossible to automatically and accurately identify the anomaly of the bearing, based on the data sequence acquired through the detection of the operation of the bearing.

Moreover, since a deterioration state of an individual bearing significantly changes due to an implementation environment, an arrangement, an operation state and the like, the anomaly of such a bearing also cannot be accurately determined with accumulation of operation time, accumulation of the rotation number, and the like. Meanwhile, since great damage to the bearing or the like may also seriously affect the equipment, a system and the like in which the bearing is mounted, accurate detection of the initial damage state, which is a stage prior to such great damage, has been desired in order to address the state with replacement or the like.

Accordingly, the model learning unit 140 of this embodiment calculates a normal periodic operation of the bearing in a time domain, based on the data sequence acquired through the detection of the operation of the bearing, according to the regression model in the time direction. The detecting apparatus 100 then subtracts the calculated periodic component in the time domain, from the detected data sequence in the time domain, thereby calculating the non-periodic component different from the periodic operation, and detecting the anomaly of the bearing based on the non-periodic component.

The model learning unit 140, as an example, predicts time-series data indicating the periodic operation of the bearing, according to a linear autoregressive model, by use of the detected data sequence in the time domain (that is, a time waveform that is a sensor output). Here, the model learning unit 140 predicts the time-series data for each divided data sequence, by use of the linear autoregressive model for each of the ten sets of the divided data sequences divided by the dividing unit 130. The model learning unit 140, for example, models $x_1^t$ as shown in the following expression, where $x_1^t$ to $x_9^t$ are the detection data CH1 to CH9 at time t in one of the divided data sequences.

$$x_1^t = \begin{pmatrix} x_2^t \\ \vdots \\ x_9^t \\ x_1^{t-1} \\ \vdots \\ x_9^{t-1} \\ \vdots \\ x_1^{t-d} \\ \vdots \\ x_9^{t-d} \end{pmatrix}^T \vec{a} \qquad \text{[Expression 1]}$$

In other words, the model learning unit 140 models $x_1^t$ as $X_1^t$ with data in the divided data sequence excluding $x_1^t$. Here, d is a natural number greater than or equal to one, and t–d denotes a past time before time t. In this embodiment, as an example, the modeling has been performed with d=29. In other words, an example will be described in which the model learning unit 140 has performed the modeling with 269 (=9×30–1) pieces of data in the divided data sequence excluding $x_1^t$. Moreover, Vector a is a column vector including m (=9×(d+1)–1, that is, 269) elements.

As in the case of $x_1^t$, the model learning unit 140 also models $x_n^t$ as $X_n^t$ for $x_2^t$ to $x_9^t$, with 269 pieces of data in the divided data sequence excluding $x_n^t$. The model learning unit 140 learns the models $X_1^t$ to $X_9^t$ corresponding to $x_1^t$ to $x_9^t$, respectively, so that the following equation holds.

$$\underset{\vec{a}}{\operatorname{argmin}} \left\{ \sum_t (X_n^t - x_n^t)^2 + \lambda |\vec{a}|_{L1} \right\} \qquad \text{[Expression 2]}$$

Here, argmin f(x) denotes x in the case where f(x) becomes minimum, which means calculation of Vector a in the case where the expression (Expression 2) becomes minimum. In other words, it is equivalent to calculation of Vector a that most closely approximates the model $X_1^t$ to, for example, a measured value $x_1^t$ from the measuring apparatus, at time t to t–d. The first term in the expression (Expression 2) is known as a square loss function. $|a|_{L1}$ of the second term in the expression (Expression 2) denotes an L1 regularization term, as expressed by the following equation.

$$|\vec{a}|_{L1} = \sum_i |a_i| \qquad \text{[Expression 3]}$$

$$\text{Here } \vec{a} = \begin{pmatrix} a_1 \\ \vdots \\ a_m \end{pmatrix}$$

The L1 regularization term of the second term is a regularization term added in order to provide a sparse matrix in which most of components of the square loss function of the first term become zero. In other words, the model learning unit 140 will calculate Vector a for modeling the detection data by use of less data (for example, less than 269 pieces of data), through introduction of the L1 regularization term. Here, λ for setting the magnitude of the regularization term is a parameter that controls the number of zero elements included in the square loss function to be estimated, and is a regularization parameter that is previously defined by a user or the like. Here, as an example, the regularization parameter λ is set to a value less than or equal to approximately 0.01. The expression (Expression 2) shown in the above description is a method known as a linear autoregressive model.

The model learning unit 140 of this embodiment, as described above, performs regression by use of 269 data values for a data value at one point, and calculates nine pieces of prediction data corresponding to the detection data CH1 to CH9, for the same time t, through learning. The model learning unit 140 then calculates a prediction data sequence corresponding to one of the sets of the divided data sequences, according to the same model. The model learning unit 140 calculates prediction data sequences corresponding to other sets of the divided data sequences, according to different models (by use of different Vectors a in the expression (Expression 2)), respectively.

In this way, the model learning unit 140 models the divided data sequences to calculate the prediction data sequence, for each set of the divided data sequences, and can thus more precisely predict each divided data sequence. In addition, the model learning unit 140 uses the data sequence for a sufficiently long time interval that is several times or more longer than a period of a periodic signal component, and can thus accurately predict the periodic component. The model learning unit 140, as an example, forms a regression model with 5 kHz sampling data in the detecting apparatus, in a time domain for 30 points, and can thus accurately predict a frequency component in a domain less than or equal to 2.5 kH.

Here, even if a non-periodic component that has suddenly occurred is included in a divided data sequence, the occurrence of the non-periodic component in the divided data sequence is temporally in a short time, in comparison to a periodic component having a constant amplitude in the entire time of the data sequence used for the model (for example, the time domain for 30 points of the data). Accordingly, the model learning unit 140 will calculate a lower value as a result of prediction of the non-periodic component, in comparison to the prediction result of the periodic component. In other words, the model learning unit 140 can calculate the prediction data sequence with little effect of the non-periodic component. As above, the model learning unit 140 of this embodiment models the divided data sequence, and calculates the periodic component in the divided data sequence, excluding the non-periodic component, as the model component.

The difference calculating unit 150 next calculates the non-periodic components that are the differences between the divided data sequences and the model components (S240). The difference calculating unit 150, for example, subtracts a first model component, which has been calculated based on a first set of the divided data sequences by the model learning unit 140, from the first set of the divided data sequences, and thereby calculates a first non-periodic component. The difference calculating unit 150 similarly calculates ten sets of the non-periodic components corresponding to the ten sets of the divided data sequences, respectively.

As above, the detecting apparatus 100 of this embodiment can calculate the non-periodic component of the divided data sequence, and can thus detect the anomaly of the bearing based on the non-periodic component. The non-periodic component of the divided data sequence will be described using FIGS. 6 and 7.

Figure 6:
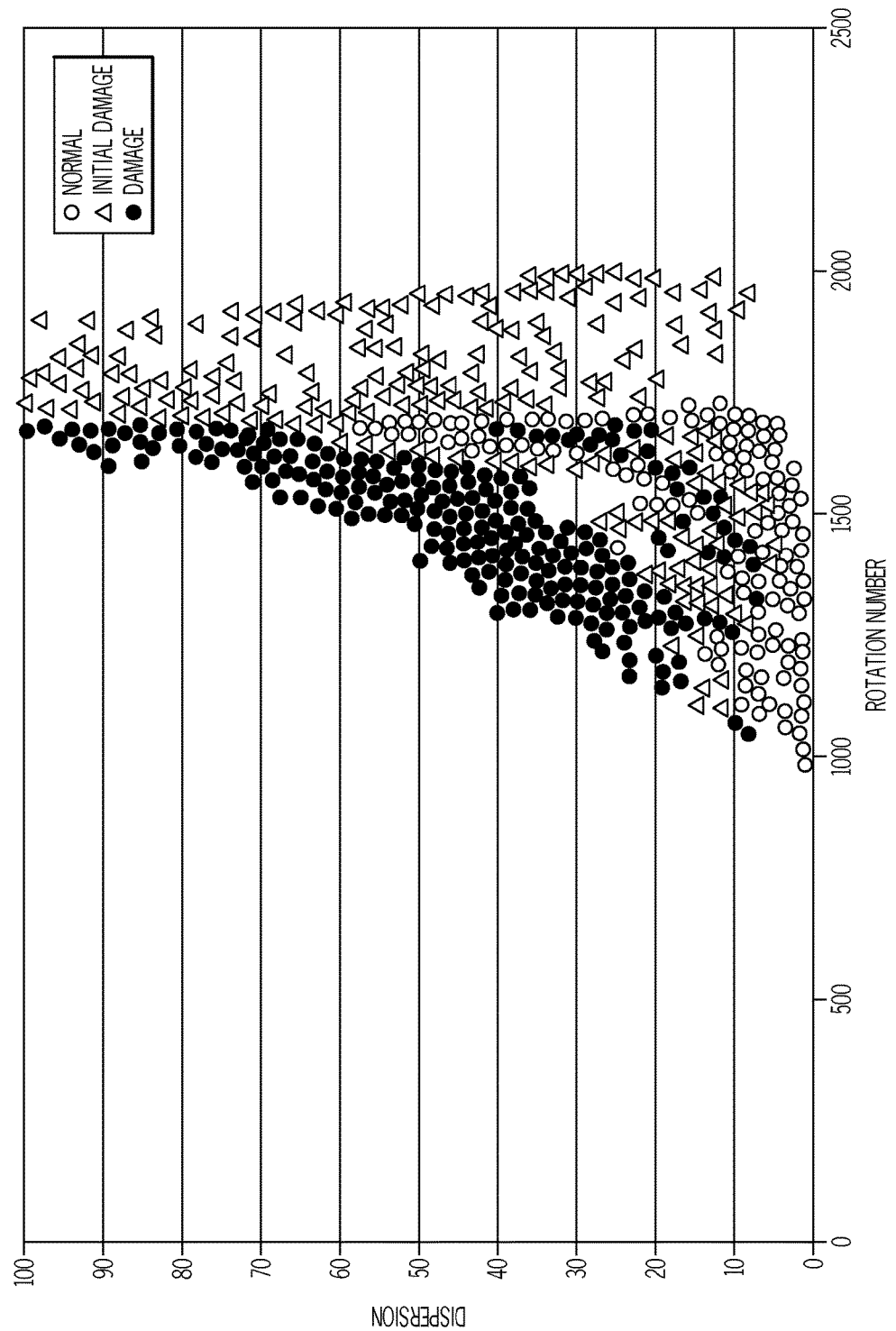
FIG. 6 illustrates an example of a dispersion value of an amplitude value with respect to an average rotation number of a divided data sequence according to this embodiment.

FIG. 6 illustrates an example of a dispersion value of an amplitude value with respect to an average rotation number of the divided data sequence according to this embodiment. The horizontal axis indicates the average rotation number of the divided data sequence, and the vertical axis indicates the dispersion value of the divided data sequence. FIG. 6 illustrates an example in which the damage and the like to the bearing are actually examined after the divided data sequence is obtained, and thereby each data is classified and plotted as normal, initial damage, and damage. From FIG. 6, each of the data indicating normal, initial damage, and damage cannot obtain a particular tendency with respect to the rotation number and the dispersion value. In particular, the data for normal and the data for initial damage are nearly randomly mixed, and thus cannot be discriminated from each other based on the rotation number and the dispersion value.

Figure 7:
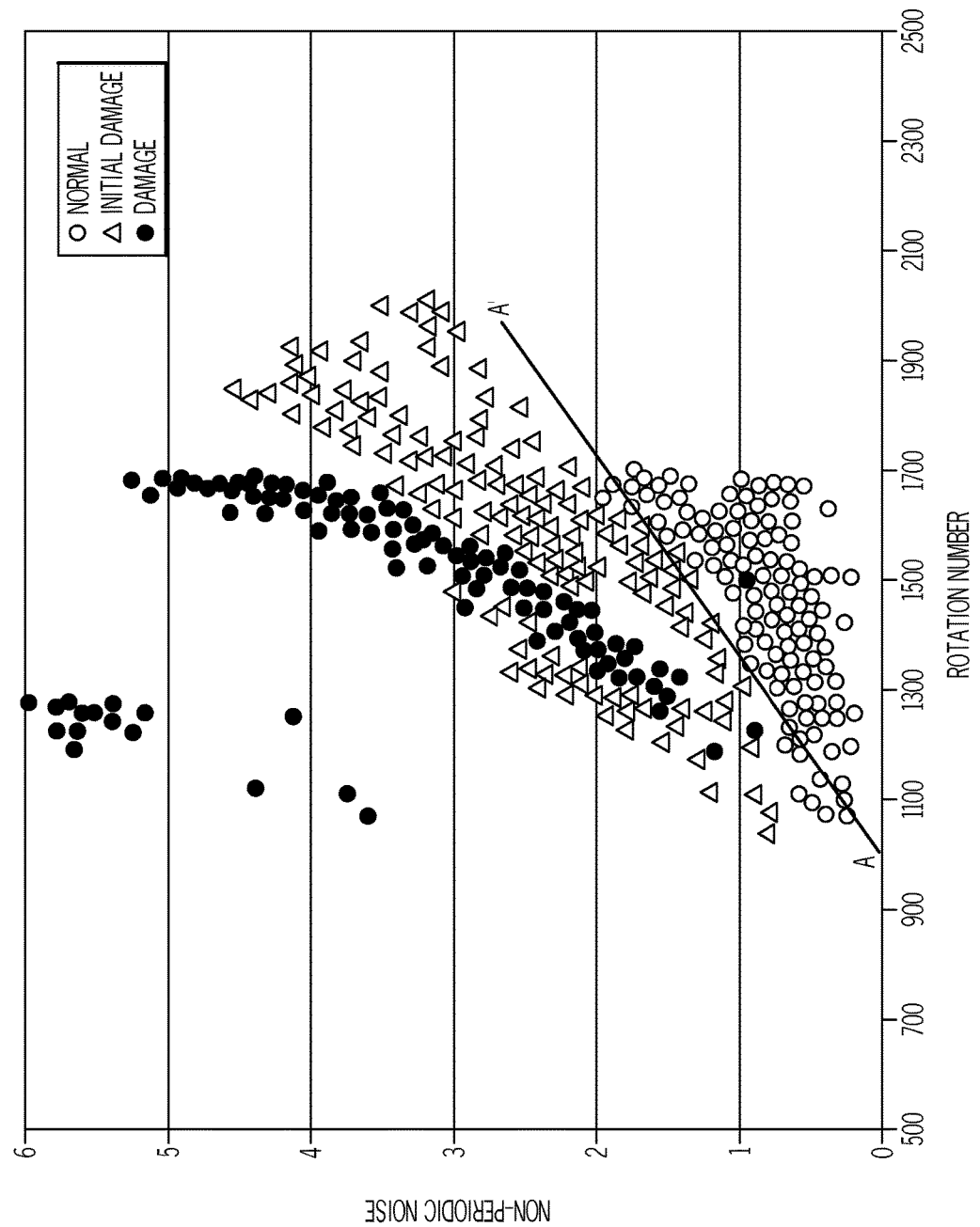
FIG. 7 illustrates an example of a dispersion value of a non-periodic component with respect to the average rotation number of the divided data sequence according to this embodiment.

FIG. 7 illustrates an example of a dispersion value of the non-periodic component with respect to the average rotation number of the divided data sequence according to this embodiment. As in the case of 6, the horizontal axis indicates the average rotation number of the divided data sequence, and the vertical axis indicates the dispersion value of the amplitude value of the non-periodic component. Moreover, FIG. 7 illustrates the non-periodic component calculated depending on the model component that has been calculated through learning with the divided data sequence used in FIG. 6, according to the regression model. As can be seen from FIG. 7, each of the data indicating normal, initial damage, and damage exists in each particular domain with respect to the rotation number and the dispersion value. For example, the data for normal and the data for initial damage can be approximately separated by line A-A' in the figure.

Accordingly, the detecting apparatus 100 can discriminate the anomaly of the bearing, depending on the rotation number and the non-periodic component of the divided data sequence. Moreover, the detecting apparatus 100 detects the anomaly of the bearing by use of feature quantities based on the rotation number and the non-periodic component, in order to easily and automatically execute such discrimination with high accuracy.

In other words, the feature quantity calculating unit 160 calculates the feature quantities of the non-periodic components, based on the non-periodic components calculated by the difference calculating unit 150 (S250). The feature quantity calculating unit 160 may calculate the divided data feature quantities including at least one of the dispersion, the deviation and the average of the difference components, and discriminate the anomaly of the bearing. In addition, the feature quantity calculating unit 160 of this embodiment calculates ranked feature quantities.

The feature quantity calculating unit 160 transforms each of a plurality of the divided data feature quantities for the plurality of divided data sequences, into the ranked feature quantity for which each element takes a value indicating its ranking according to the magnitude of its element value in the plurality of divided data sequences. An example will be described using FIGS. 8 to 10, in which the feature quantity calculating unit 160 transforms the divided data feature quantities into the ranked feature quantities.

FIG. 8 illustrates an example of the feature quantities calculated by the feature quantity calculating unit 160 of this embodiment. In FIG. 8, Samples 1 to 3 denote the first to third sets of the divided data sequences, as an example. Moreover, i1 to i3, for example, denote the feature quantities, such as the dispersion, the deviation and the average of the difference components, which have been calculated by the feature quantity calculating unit 160. Moreover, i4, as an example, denotes an average value of the rotation number. Next, the feature quantity calculating unit 160 defines the rank of each of the divided data sequences, for each of the feature quantities i1 to i4.

FIG. 9 illustrates an example of the ranks of the feature quantities of the divided data sequences, which have been defined by the feature quantity calculating unit 160 of this embodiment. Samples 1 to 3 and i1 to i4 in FIG. 9 are substantially the same as those with the same reference characters in FIG. 8, and thus description thereof is omitted. FIG. 9 illustrates an example of the rank of each of the divided data sequences defined in ascending order of the value, for each of the feature quantities i1 to i4, by the feature quantity calculating unit 160. Here, the feature quantity calculating unit 160 may reorder each sample according to its rank for a predetermined i-th feature quantity. Next, the feature quantity calculating unit 160 linearly transforms the ranks for each feature quantity into a predetermined value range, according to the ranks for the feature quantity.

FIG. 10 illustrates an example of the feature quantities of the divided data sequences, which have been linearly transformed by the feature quantity calculating unit 160 of this embodiment. Samples 1 to 3 and i1 to i4 in FIG. 10 are substantially the same as those with the same reference characters in FIGS. 8 and 9, and thus description thereof is omitted. FIG. 10 illustrates an example of the linear transformation performed by the feature quantity calculating unit 160 so that the sample at Rank 1 becomes 0 and the sample at the lowest rank becomes 1. The feature quantities illustrated in FIG. 10 become the ranked feature quantities transformed according to the ranks for the feature quantities.

Here, ranges of numerical values that can be taken as value ranges of the feature quantities illustrated in FIG. 8 are different, for example, the range of 3 to 33 for i1 and the range of 1000 to 3000 for i4. It is thus difficult to make a comprehensive determination in consideration of different feature quantities. Consequently, the feature quantity calculating unit 160 transforms the value ranges of all the feature quantities into the predetermined value range, as illustrated in FIG. 10. The detecting apparatus 100 can thereby compare and consider even the different feature quantities in substantially the same numerical range.

The anomaly detecting unit 170 next detects the anomaly of the operating body, based on the divided data feature quantities transformed into the ranked feature quantities for each of the plurality of divided data sequences (S260). The anomaly detecting unit 170, for example, inputs the divided data feature quantities into Support Vector Machine (SVM), and calculates probability of anomaly of the set of the divided data sequences corresponding to the divided data feature quantities. SVM is known as an approach for linear separation of input data.

In other words, since the feature quantity calculating unit 160 has transformed the plurality of divided data sequences into the corresponding ranked feature quantities, the anomaly detecting unit 170 can calculate the probability of anomaly of the divided data sequences, depending on a plurality of feature quantities, by use of known identification approaches, such as SVM and logistic regression. The anomaly detecting unit 170, as an example, calculates an average value of the probability of anomaly of the first to tenth sets, and sets the calculated average value as a score of the degree of anomaly indicating the probability of anomaly of the entire detection data obtained by the detection data obtaining unit 110.

The anomaly detecting unit 170 compares the calculated score of the degree of anomaly to a predetermined threshold or the like, and thereby detects presence or absence of the anomaly of the bearing corresponding to the detection data. The anomaly detecting unit 170 may determine that the anomaly has been detected if the score of the degree of anomaly is greater than or equal to the threshold, and may execute output of an alert with audio, light, an image or the like, display of the anomaly detection, as well as notification to another system or the like.

The detecting apparatus 100 determines whether or not to end the anomaly detection of the bearing (S270). The detecting apparatus 100 may determine whether or not to end the anomaly detection of the bearing, in accordance with external input, the user's input, and the like. If the anomaly detection of the bearing is continued (S270: No), the detecting apparatus 100 returns to the step of obtaining the detection data (S200) to obtain data to be detected. Alternatively, if the anomaly detection is ended (S270: Yes), the detecting apparatus 100 stops the process.

As above, the detecting apparatus 100 according to this embodiment learns the time-series data in the time domain according to the regression model, calculates a periodic component of the detection signal in response to the periodic operation of the bearing, and can thus cancel the periodic component from the detection signal to obtain a non-periodic component. In this way, the detecting apparatus 100 extracts the non-periodic component without simultaneous analysis of the periodic component and the non-periodic component, and can thus more accurately detect the anomaly of the bearing. Moreover, the detecting apparatus 100 accurately discriminates the operation state by use of the plurality of feature quantities. The detecting apparatus 100 can more accurately determine the normal operation state and the initial damage state of the bearing, for example, by use of the feature quantities based on the rotation number and the non-periodic component of the bearing.

In the above detecting apparatus 100 of this embodiment, an example has been described in which the anomaly detecting unit 170 detects the anomaly of the operating body, based on the ranked feature quantities transformed from the feature quantities. Alternatively, the anomaly detecting unit 170 may detect the anomaly of the operating body, based on the feature quantities calculated by the feature quantity calculating unit 160. In this case, the anomaly detecting unit 170 detects the anomaly of the operating body, by use of the magnitude of an absolute value, an average value, dispersion, a root-mean-square and the like of the non-periodic component, in comparison to a predetermined value or the like.

Figure 11:
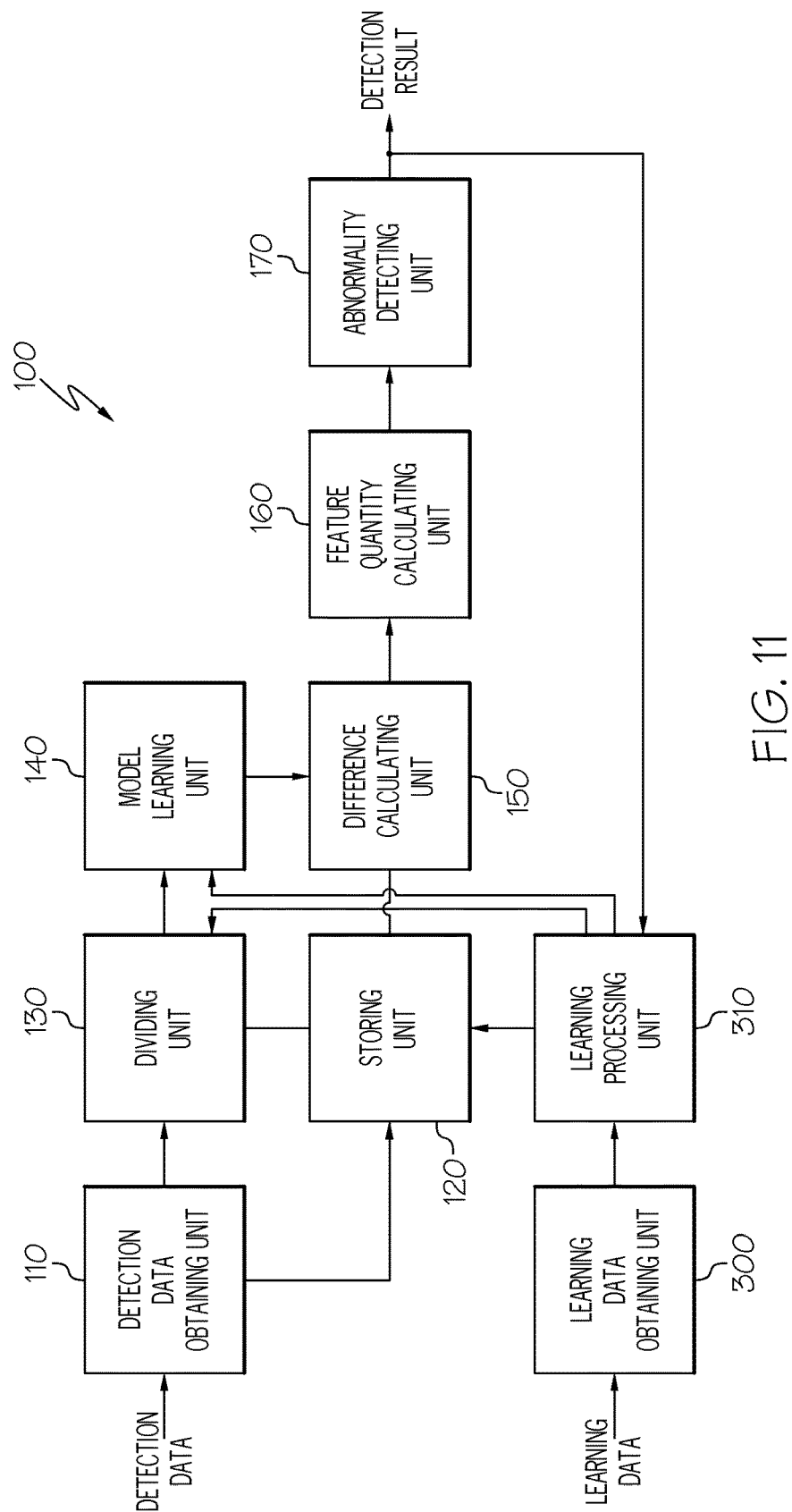
FIG. 11 illustrates a modified example of the detecting apparatus according to this embodiment.

FIG. 11 illustrates a modified example of the detecting apparatus 100 according to this embodiment. In the detecting apparatus 100 of this modified example, operations that are substantially the same as those in the detecting apparatus 100 according to this embodiment as illustrated in FIG. 1 are assigned the same reference numerals, and description thereof is omitted. The detecting apparatus 100 of this modified example further includes a learning data obtaining unit 300 and a learning processing unit 310, and evaluates the regression model to execute the anomaly detection with high accuracy.

The learning data obtaining unit 300 obtains a plurality of data sequences for learning, each being associated with target data for learning indicating presence or absence of the anomaly of the operating body. The learning data obtaining unit 300, as an example, obtains learning data including data for model learning, data for model evaluation, as well as target data corresponding to each of the data for model learning and the data for model evaluation. The data for model learning is used for learning the regression model, and the data for model evaluation is used for evaluating the learned regression model.

The learning data obtaining unit 300, for example, obtains the learning data through input from the user or the like. The learning data obtaining unit 300 may also read and obtain the learning data stored in a predetermined format. Moreover, the learning data obtaining unit 300 may be connected to a network or the like, and may obtain the learning data through the network. The learning data obtaining unit 300 supplies the obtained learning data to the learning processing unit 310. In FIG. 11, while the learning data obtaining unit 300 is separately illustrated to be independent of the detection data obtaining unit 110, the learning data obtaining unit 300 may alternatively be identical to the detection data obtaining unit 110.

The learning processing unit 310 causes the degree of anomaly outputted from the anomaly detecting unit 170 to be learned by use of the plurality of data sequences for learning (that is, the data for model learning and the data for model evaluation), as well as a plurality of pieces of the target data corresponding to the data for model learning and the data for model evaluation. The learning processing unit 310 is connected to the learning data obtaining unit 300, and causes the regression model to be learned by use of received data for model learning. Here, the learning processing unit 310 may be connected to the storing unit 120 to store the received learning data. The learning processing unit 310 may be connected to the dividing unit 130 and the model learning unit 140, and may instruct them to learn the regression model.

Moreover, the learning processing unit 310 is connected to the anomaly detecting unit 170, receives a result of the detection, which is calculated by use of the learned regression model and the data for model evaluation, from the anomaly detecting unit 170, and evaluates the learned regression model. The learning processing unit 310, based on a result of the evaluation, gives instruction for learning of the regression model learned by the model learning unit 140. Operations in the detecting apparatus 100 of this modified example will be described using FIG. 12.

Figure 12:
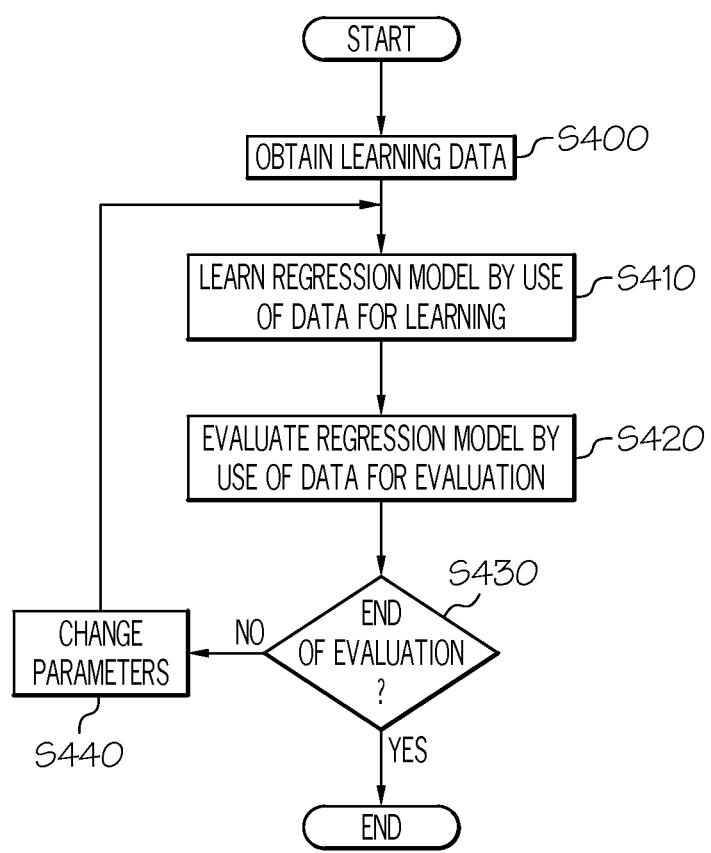
FIG. 12 illustrates an operational flow of the modified example of the detecting apparatus 100 according to this embodiment.

FIG. 12 illustrates an operational flow of the modified example of the detecting apparatus 100 according to this embodiment. The learning data obtaining unit 300 first obtains the learning data (S400). In this embodiment, an example will be described in which the learning data obtaining unit 300 obtains time-series data acquired through detection of operations of a total of 17 bearings, including ten bearings performing the normal operation and seven bearings that had performed the abnormal operation, as the learning data.

The learning data obtaining unit 300, as an example, obtains eight pieces of the time-series data for the normal operation state, and five pieces of the time-series data for an abnormal operation state, as the data for model learning. The learning data obtaining unit 300 also obtains two pieces of the time-series data for the normal operation state, and two pieces of the time-series data for the abnormal operation state, as the data for model evaluation. Moreover, the learning data obtaining unit 300 obtains a correspondence relationship indicating whether each of a total of 17 pieces of the time-series data is the data for the normal operation or for the abnormal operation of the bearing, as the target data. Here, the target data may include a correspondence relationship indicating whether each piece of the time-series data is the data for model learning or the data for model evaluation.

The learning processing unit 310 next learns the regression model by use of the data for model learning in the learning data, depending on the correspondence relationship in the target data (S410). The learning processing unit 310 supplies the data for model learning to the storing unit 120, and instructs the dividing unit 130 to divide the data for model learning. The division into the divided data sequences by the dividing unit 130, and the operations following the division have been described in FIG. 2, and thus are omitted here. The learning processing unit 310 causes the model learning unit 140 to learn the regression model corresponding to the data for model learning including a total of 13 pieces of the time-series data.

The learning processing unit 310 next evaluates the regression model by use of the learned regression model and the data for model evaluation (S420). The learning processing unit 310 supplies the data for model evaluation to the storing unit 120, and instructs the dividing unit 130 to divide the data for model evaluation. Moreover, the learning processing unit 310 instructs the model learning unit 140 to calculate the model components by use of the learned regression model. The calculation of the model components by the model learning unit 140, and the operations following the calculation of the model components have been described in FIG. 2, and thus are omitted here.

The learning processing unit 310 obtains four detection results corresponding to the data for model evaluation including the four pieces of the time-series data, from the anomaly detecting unit 170. The learning processing unit 310 compares the obtained detection results to the target data, and evaluates the regression model. The learning processing unit 310, for example, calculates a ratio of the number of pieces of the time-series data actually indicating the anomaly, to the number of detection results for the anomaly, as an accuracy rate. Moreover, the learning processing unit 310 may calculate a ratio of the number of failures in the detection of the anomaly, to the number of pieces of the time-series data actually indicating the anomaly, as a failure rate.

The learning processing unit 310 determines whether or not to end the evaluation of the regression model, depending on the evaluation result (S430). The learning processing unit 310, for example, compares the accuracy rate and the failure rate to a predetermined target value, and determines whether or not to end the evaluation, depending on a result of the comparison.

If the evaluation is continued (S430: No), the learning processing unit 310 instructs the model learning unit 140 to change parameters (S440). The learning processing unit 310, for example, changes the parameters, such as a regression coefficient and the regularization parameter λ in the regression model. The model learning unit 140 performs the learning again by use of the data for model learning after the change of the parameters (S410). The learning processing unit 310 repeats the learning (S410) and the evaluation (S420) of the regression model, until the accuracy rate becomes higher than or equal to the target value, and/or until the failure rate becomes lower than or equal to the target value.

If the accuracy rate has become higher than or equal to the target value, and/or if the failure rate has become lower than or equal to the target value, the learning processing unit 310 ends the evaluation of the regression model (S430: Yes).

Moreover, if the learning and the evaluation of the regression model have been repeated for a predetermined number of times, the learning processing unit 310 may end the evaluation of the regression model.

The detecting apparatus 100 may execute the anomaly detection for subsequent detection data, by use of the evaluated regression model, or may alternatively learn the regression model by use of the parameters determined in the process of the evaluation, and execute the anomaly detection for the detection data. As above, the detecting apparatus 100 of this modified example previously learns and evaluates the regression model by use of the target data that should be the detection result, and can thus improve the accuracy rate and the failure rate to execute the anomaly detection with high accuracy.

In the above detecting apparatus 100 according to this embodiment, an example has been described in which the detection data obtaining unit 110 obtains the detection data detected by the detecting apparatus at each predetermined time. Alternatively, the detection data obtaining unit 110 may obtain more of the detection data, for example, the entire detection data. In this case, the dividing unit 130 splits the time-series data acquired through the detection of the operation of the operating body, at predetermined time intervals, and generates a plurality of data sequences. In other words, for example, even if the detection data obtaining unit 110 obtains the detection data for three hours, the dividing unit 130 generates ten sets of divided data sequences for each minute.

The detecting apparatus 100 then detects the anomaly of the operating body, depending on each of the plurality of data sequences. The detecting apparatus 100, as an example, may detect the anomaly of the operating body for each of the ten sets of the divided data sequences, and repeat the detection for 18 times to execute the detection for the entire detection data for three hours. Moreover, if the operating body is completely broken, and for example, such a waveform as illustrated in FIG. 5 is detected after the transformation into the frequency domain, the operating body will not perform the normal operation. Accordingly, the detecting apparatus 100 may omit the anomaly detection for the bearing whose anomaly has been continuously detected for longer than a predetermined time. In this case, the detecting apparatus 100 may notify the user, the system or the like of the continuation of the anomaly detection.

In the above detecting apparatus 100 according to this embodiment, it has been described that the model learning unit 140 models data $x_n{}'$ at time t by use of temporally contiguous data at time t to t–d, in the divided data sequence divided by the dividing unit 130. Alternatively, the model learning unit 140 may thin the data and model $x_1{}'$ by use of data at time t to t–d' (d<d').

Here, d' may be a value several times or more greater than d, and for example, the model learning unit 140 may use data of a different contiguous divided data sequence. The model learning unit 140 performs the modeling by use of data for a temporally longer interval, and can thereby more significantly reduce the effect of the non-periodic component that suddenly occurs, and can accurately calculate the periodic component, excluding the non-periodic component, as the model component.

In the above detecting apparatus 100 according to this embodiment, it has been described that the model learning unit 140 uses the linear autoregressive model in the expression (Expression 2), including the L1 regularization term in addition to the square loss function. Alternatively, the model learning unit 140 may replace the loss function with a more robust function, or may replace the L1 regularization term with an L2 regularization term as expressed by the following equation.

$$\|\vec{a}\|^2 = \sum_i |a_i|^2 \qquad \text{[Expression 4]}$$

Alternatively, the model learning unit 140 may set the regularization parameter to be a value less than 0.01, or may eliminate any regularization term. In this way, the model learning unit 140 may reduce the effect of the regularization term, and thereby cause the regression model to be over-learned to calculate the periodic component of the time waveform. Moreover, the model learning unit 140 may use a non-linear autoregressive model.

Figure 13:
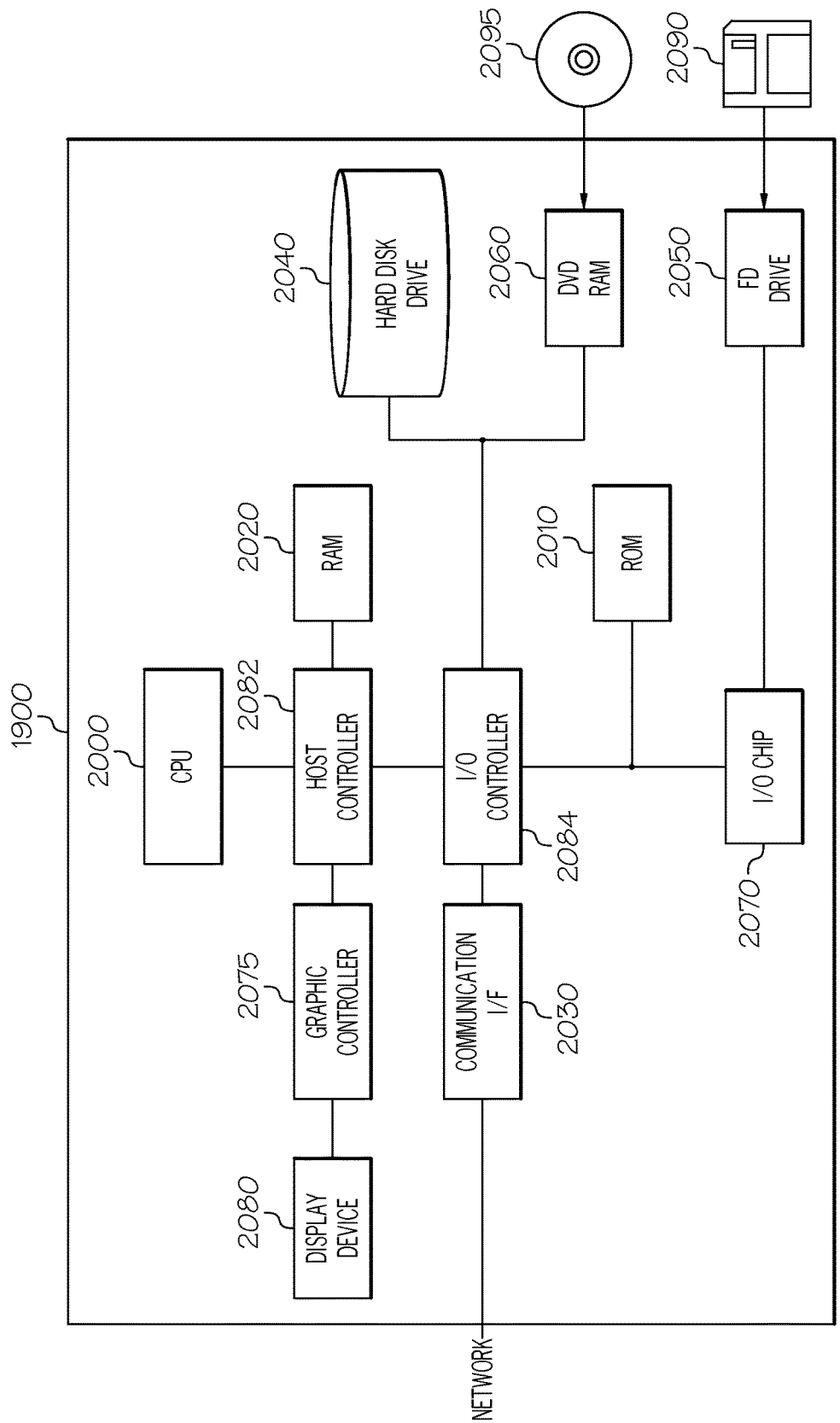
FIG. 13 illustrates an example of a hardware configuration of a computer functioning as the detecting apparatus 100 according to this embodiment.

FIG. 13 illustrates an example of a hardware configuration of a computer 1900 functioning as the detecting apparatus 100 according to this embodiment. The computer 1900 according to this embodiment includes a CPU peripheral section including a CPU 2000, a RAM 2020, a graphic controller 2075, and a display device 2080, which are connected to each other via a host controller 2082; an input/output section including a communication interface 2030, a hard disk drive 2040, and a DVD drive 2060, which are connected to the host controller 2082 via an input/output controller 2084; and a legacy input/output section including a ROM 2010, a flexible disk drive 2050, and an input/output chip 2070, which are connected to the input/output controller 2084.

The host controller 2082 connects the RAM 2020 to the CPU 2000 and the graphic controller 2075, which access the RAM 2020 at high transfer rates. The CPU 2000 operates based on programs stored in the ROM 2010 and the RAM 2020 to control each section. The graphic controller 2075 obtains image data generated by the CPU 2000 or the like on a frame buffer provided in the RAM 2020, and displays the image data on the display device 2080. Alternatively, the graphic controller 2075 may include a frame buffer therein that stores image data generated by the CPU 2000 or the like.

The input/output controller 2084 connects the host controller 2082 to the communication interface 2030, the hard disk drive 2040, and the DVD drive 2060, which are relatively high-speed input/output devices. The communication interface 2030 communicates with another apparatus through a network. The hard disk drive 2040 stores programs and data used by the CPU 2000 in the computer 1900. The DVD drive 2060 reads programs or data from a DVD-ROM 2095, and supplies the program or the data to the hard disk drive 2040 via the RAM 2020.

The input/output controller 2084 is also connected to the ROM 2010, the flexible disk drive 2050, and the input/output chip 2070, which are relatively low-speed input/output devices. The ROM 2010 stores a boot program executed at the time of booting of the computer 1900, and/or programs or the like depending on hardware of the computer 1900. The flexible disk drive 2050 reads programs or data from a flexible disk 2090, and supplies the program or the data to the hard disk drive 2040 via the RAM 2020. The input/output chip 2070 connects the flexible disk drive 2050 to the input/output controller 2084, and also connects various input/output devices to the input/output controller 2084 via, for example, a parallel port, a serial port, a keyboard port, a mouse port, and the like.

The programs supplied to the hard disk drive 2040 via the RAM 2020 are stored on a recording medium, such as the flexible disk 2090, the DVD-ROM 2095, or an IC card, and are provided by the user. The programs are read from the recording medium, installed into the hard disk drive 2040 in the computer 1900 via the RAM 2020, and executed in the CPU 2000.

A program is installed into the computer 1900, and causes the computer 1900 to function as the detection data obtaining unit 110, the storing unit 120, the dividing unit 130, the model learning unit 140, the difference calculating unit 150, the feature quantity calculating unit 160, and the anomaly detecting unit 170.

Information processing written in the program is loaded to the computer 1900, and thereby functions as the detection data obtaining unit 110, the storing unit 120, the dividing unit 130, the model learning unit 140, the difference calculating unit 150, the feature quantity calculating unit 160, and the anomaly detecting unit 170, which are concrete means realized by software and the above described various hardware resources in cooperation with each other. This concrete means then implements calculation or processing of information according to the intended use of the computer 1900 in this embodiment, and thereby the specific detecting apparatus 100 according to the intended use is constructed.

As an example, if the computer 1900 performs communication with an external apparatus or the like, the CPU 2000 executes a communication program loaded on the RAM 2020, and instructs the communication interface 2030 to perform a communication process based on processing content written in the communication program. Under control of the CPU 2000, the communication interface 2030 reads transmission data stored in a transmission buffer area or the like provided on a storage device, such as the RAM 2020, the hard disk drive 2040, the flexible disk 2090, or the DVD-ROM 2095, and transmits the transmission data to the network, or the communication interface 2030 writes reception data received from the network into a reception buffer area or the like provided on the storage device. In this way, the communication interface 2030 may transfer transmission/reception data from and to the storage device according to the DMA (direct memory access) method. Alternatively, the CPU 2000 may read data from a storage device or the communication interface 2030 at a transfer source, and write the data into the communication interface 2030 or a storage device at a transfer destination, and thereby the transmission/reception data may be transferred.

Moreover, the CPU 2000 loads all or a necessary part of a file, a database or the like stored in an external storage device, such as the hard disk drive 2040, the DVD drive 2060 (DVD-ROM 2095), or the flexible disk drive 2050 (flexible disk 2090), into the RAM 2020 through the DMA transfer or the like, and performs various processes for the data on the RAM 2020. The CPU 2000 then writes the processed data back to the external storage device through the DMA transfer or the like. In such processes, since the RAM 2020 can be considered to temporarily retain the content of the external storage device, the RAM 2020, the external storage device and the like are collectively referred to as "memory," "storage unit," "storage device" or the like in this embodiment. Various types of information, such as various programs, data, tables, and databases, in this embodiment are stored on such a storage device and subjected to information processing. It should be noted that the CPU 2000 may also retain a part of data of the RAM 2020, in a cache memory, and perform read and write operations on the cache memory. Even in such a form, since the cache memory undertakes some of functions of the RAM 2020, it is assumed in this embodiment that the cache memory is also included in the RAM 2020, the memory, and/or the storage device, unless separately indicated.

Moreover, the CPU 2000 performs, for data read from the RAM 2020, various processes specified by an instruction sequence in a program, including various types of calculation, information processing, condition determination, retrieval and replacement of information, and the like as described in this embodiment. The CPU 2000 then writes the processed data back to the RAM 2020. For example, if the CPU 2000 performs the condition determination, the CPU 2000 compares each of various variables shown in this embodiment to another variable or a constant, and determines whether a condition is satisfied. The condition includes whether the variable is greater than the other variable or the constant, whether the variable is less than the other variable or the constant, whether the variable is greater than or equal to the other variable or the constant, whether the variable is less than or equal to the other variable or the constant, and whether the variable is equal to the other variable or the constant. If the condition is satisfied (or if the condition is not satisfied), the process branches to a different instruction sequence, or a subroutine is called.

Moreover, the CPU 2000 may search for information stored in a file, a database or the like in the storage device. For example, if a plurality of entries, in each of which an attribute value of a second attribute is associated with an attribute value of a first attribute, are stored in the storage device, the CPU 2000 searches for an entry whose attribute value of the first attribute satisfies a specified condition, from the plurality of entries stored in the storage device, reads the attribute value of the second attribute stored in the entry, and can thereby obtain the attribute value of the second attribute associated with the first attribute satisfying the predetermined condition.

The above described programs or modules may be stored on an external recording medium. In addition to the flexible disk 2090 and the DVD-ROM 2095, an optical recording medium such as a DVD, Blu-ray® or a CD, a magneto-optical recording medium such as an MO, a tape medium, a semiconductor memory such as an IC card, or the like may be used as the recording medium. Moreover, a storage device, such as a hard disk or a RAM, provided in a server system connected to a private communication network or the Internet may be used as the recording medium, and the programs may be provided to the computer 1900 through the network.

While the present invention has been described above with the embodiment, the technical scope of the present invention is not limited to the scope of the description of the above described embodiment. It is obvious to those skilled in the art that various changes or improvements can be added to the above described embodiment. It is obvious from the description of the claims that forms with such changes or improvements may also be included in the technical scope of the present invention.

It should be noted that, regarding execution order of processes in operations, procedures, steps, stages and the like in the apparatuses, the systems, the programs, and the methods described in the claims, the description, and the drawings, particular expressions such as "before" and "prior to" are not explicitly indicated, and the apparatuses, the systems, the programs, and the methods can be implemented in any order unless the output of a preceding process is used by a following process. Even when operation flows in the claims, the description, and the drawings are described using expressions such as "first" and "next" for convenience, this does not mean that such order is required for the implementation.

REFERENCE SIGNS LIST

100 . . . detecting apparatus
110 . . . detection data obtaining unit
120 . . . storing unit
130 . . . dividing unit
140 . . . model learning unit
150 . . . difference calculating unit
160 . . . feature quantity calculating unit
170 . . . anomaly detecting unit
300 . . . learning data obtaining unit
310 . . . learning processing unit
1900 . . . computer
2000 . . . CPU
2010 . . . ROM
2020 . . . RAM
2030 . . . communication interface
2040 . . . hard disk drive
2050 . . . flexible disk drive
2060 . . . DVD drive
2070 . . . input/output chip
2075 . . . graphic controller
2080 . . . display device
2082 . . . host controller
2084 . . . input/output controller
2090 . . . flexible disk
2095 . . . DVD-ROM

What is claimed is:

1. A system for detecting defects in a physical operating body, the system comprising:
a set of sensors configured to measure physical motion of the operating body to generate one or more data sequences that correspond to the physical motion of the operating body;
a memory; and
a processor communicatively coupled to the memory and the set of sensors, wherein the processor is configured to perform a method comprising:
receiving the one or more data sequences from the set of sensors;
temporally dividing the one or more data sequences into a plurality of divided data sequences, the plurality of divided data sequences being arranged according to an operating period of the operating body;
obtaining a plurality of model components that correspond to a normal operation state of the operating body based on the operating period, each model component corresponding to a divided data sequence in the plurality of divided data sequences;
calculating a plurality of non-periodic components using the plurality of divided data sequences and the plurality of model components;
determining an operation state for the operating body based on at least the plurality of non-periodic components; and
transmitting a notification that the operating body has an anomaly to another system in response to determining that the operation state for the operating body is not the normal operation state.

2. The system of claim 1, wherein the operation state for the operating body is selected from a group consisting of the normal operation state, an initial damage state, and a damaged state.

3. The system of claim 1, wherein determining the operation state for the operating body includes detecting one or more anomalies of the operating body.

4. The system of claim 1, wherein the set of sensors includes at least one three-dimensional acceleration sensor and a rotational sensor, wherein the method further comprises determining the operating period for the operating body, and wherein the receiving the one or more data sequences includes:
receiving a first data sequence from each of the at least one three-dimensional acceleration sensor;
receiving a second data sequence from the rotational sensor.

5. The system of claim 1, wherein obtaining the plurality of model components that correspond to the normal operation state of the operating body comprises:
receiving a first set of training data, the first set of training data corresponding to operation of the operating body when the operating body is in the normal operation state;
receiving a second set of training data, the second set of training data corresponding to operation of the operating body when the operating body is in a damaged operation state; and
processing the first and second sets of training data to learn a regression model for the operating body.

6. The system of claim 1, wherein calculating the plurality of non-period components includes subtracting each of the plurality of model components from a corresponding divided data sequence, wherein the method performed by the processor further comprises:
calculate a feature quantity for each of the divided data sequences by performing statistical analysis on the plurality of non-periodic components, wherein the feature quantity is selected from a group consisting of a dispersion of the non-periodic components, a deviation of the non-periodic components, and an average of the non-periodic components,
wherein the determining the operation state for the operating body is based on the calculated feature quantities.

7. The system of claim 6, wherein determining the operation state for the operating body comprises:
ranking each of the feature quantities according to a magnitude of values of the feature quantities;
calculating a probability of anomaly for the operating body by performing logistic regression on the ranked feature quantities; and
comparing the probability of anomaly to a predetermined threshold.

8. The system of claim 1, wherein determining the operation state for the operating body comprises:
calculating a degree of anomaly for each divided data sequence according to the operation period of the operating body;
determining an average value of the plurality of degrees of anomaly; and
comparing the average value of the plurality of degrees of anomaly to a threshold.

* * * * *